BINARY TRANSLATION NETWORK
Filed March 14, 1958
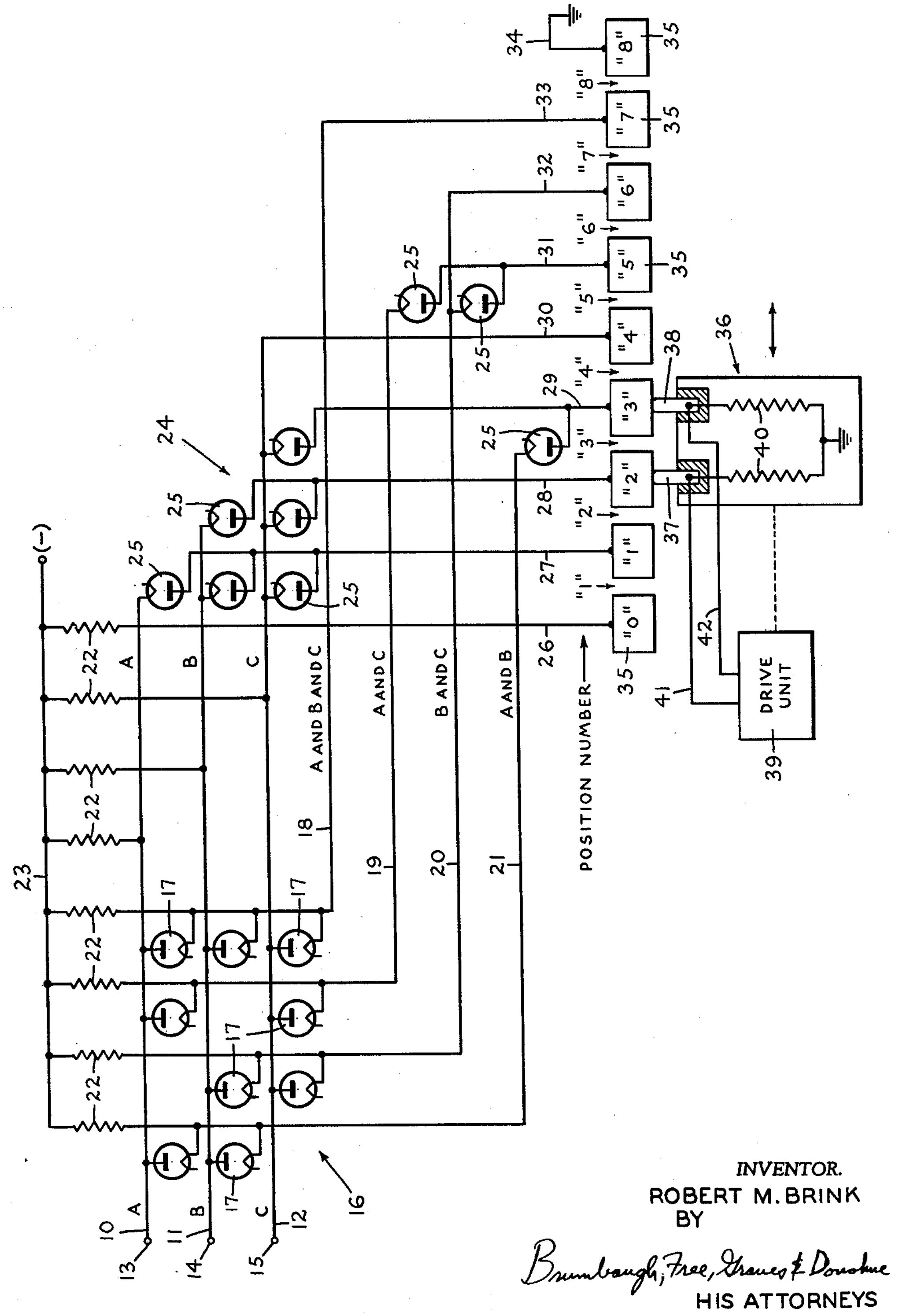
INVENTOR.
ROBERT M. BRINK
BY
Brumbaugh, Free, Graves & Donohue
HIS ATTORNEYS United States Patent Office 3,060,420

Patented Oct. 23, 1962

3,060,420

BINARY TRANSLATION NETWORK

Robert M. Brink, New Canaan, Conn., assignor to Time, Incorporated, New York, N.Y., a corporation of New York Filed Mar. 14, 1958, Ser. No. 721,406
8 Claims. (Cl. 340—347)

This invention relates to networks for translating coded information signals from one code form to another and, more particularly, to a new and improved network for translating binary coded information into a positioning signal.

In servo systems for positioning a member at one of a series of positions in response to an error signal indicating the direction of the actual location of the member from the desired position, one method of deriving the error signal requires the conversion of a binary code number representing a selected position into a signal energizing a selected portion of a series of commutator segments. In systems of this type, each position in the series is located at the boundary between two adjacent commutator segments and a selected position is indicated by the boundary between an energized and an unenergized segment. In order to avoid ambiguities in the indication of a selected position, it is apparent that all of the segments in one direction from the selected position must be energized while those in the other direction remain unenergized. Although various systems for accomplishing code translation in this manner are known, most of them are complex in arrangement and require an unnecessarily large number of components.

Accordingly, it is an object of this invention to provide a new and improved translation network for converting a binary code number representing a selected position in a series into a signal energizing all the segments of a series defining the positions in one direction from the selected position while maintaining the remaining segments unenergized.

A further object of the invention is to provide a network performing this transformation with a minimum number of diode elements.

These and other objects of the invention are attained by actuating each of a series of binary code conductors according to the condition of a corresponding digit of the binary code number, energization of a conductor representing one binary condition and deenergization the other. Each of the combination code signals causing energization of more than one binary code conductor actuates an AND gate in a first network to energize a corresponding output conductor therefrom. These output conductors, along with the binary code input conductors, form the input to a second network formation, the output therefrom comprising a series of position-indicating conductors leading to a like series of spaced commutator segments defining a series of positions. In order to energize all the position-indicating conductors of the series in one direction from a selected position represented by a combination binary code signal and none of the conductors in the other direction, the position-indicating conductor on one side of the selected position is connected through an OR gate in the second network to a corresponding first network output conductor. Energization of the remaining position-indicating conductors in the same direction from the selected position is accomplished through OR gates connecting them to the binary code or first network output conductors representing components of the combination code.

Further objects and advantages of the invention will be apparent from a reading of the following description in conjunction with the accompanying drawing which illustrates schematically a representative translation system arranged according to the invention.

In order to represent a series of positions by binary code numbers, it is apparent that each binary code number must have $m$ binary digits to represent each of a series of $2^m$ positions by a unique binary number. Furthermore, in systems indicating selected positions by boundaries between energized and unenergized commutator segments, the elimination of ambiguities in position-indication requires that all of the commutator segments in one direction from the selected position must be energized and none of the remaining segments can be energized in response to a signal representing the binary code number. As an example, if the positions of a series are represented as 1, 2, 3 . . . $2^m$, and the commutator segments by a series 0, 1, 2 . . . $2^m$, wherein each position is located at the boundary between the like-numbered and the next lower-numbered segment, a selected position $n$ may be indicated by energization of all the segments 0, 1, 2, . . . $(n-1)$, while the segments $n$, $(n+1)$, . . . $2^m$ remain unenergized.

One conventional system for energizing position-indicating conductors in this manner utilizes a first AND gate network translating a binary code input signal into a signal energizing a selected one of $2^m$ output conductors to indicate the corresponding position in the series. Each of these conductors leads to a second network and is connected therein through OR gates to all of the position-indicating conductors in one direction from the selected position. In order to perform the first of these conversions, the first network must have a bipolar input for each of the $m$ binary digits and requires a total of $m\cdot(2^m-1)$ diode elements to complete the AND gate arrangements. In addition, it can be shown that $2^{m-1}\cdot(2^m-1)-1$ diode elements are necessary in the OR gates of the second network.

In accordance with the invention, however, each digit of the binary code number is represented by a single input conductor and all the binary code input conductors supply signals to both the first and second networks, the binary code input signals being utilized in the second network to energize certain of the position-indicating conductors in one direction from the selected position. To this end, the first network is arranged with AND gates to activate output conductors representing all the combinations wherein two or more binary code input conductors are energized and these output conductors form the input to the second network in combination with the binary code conductors, the series of position-indicating conductors comprising the output therefrom. Thus, as can be readily demonstrated, the first network of this system requires only $m\cdot(2^{m-1}-1)$ diode elements to select all the combinations of energization of $m$ binary code conductors.

In order to transpose the input signals to the second network into the required pattern of energization of position-indicating conductors, the arrangement of the OR gates within this network is derived in a logical manner utilizing, in the case of each binary code combination signal activating more than one binary conductor, the energization of the binary conductors and the first network output conductors representing subcombinations of these conductors to energize the position-indicating conductors. As an aid in determining the necessary OR gate connections in the second network for the most efficient arrangement of diode elements according to this system, the binary code numbers representing the series of positions may be set down in order from the lowest value to the highest and a logical statement for each code numbers which includes that code number and all higher code numbers but excludes all lower numbers derived. Thus, in a typical example wherein eight positions are represented by a series of binary code numbers having three digits, A, B and C, the following tabulation indicates the necessary diode connections. In this example "0"

indicates no energization and "1" negative energization of the corresponding binary code conductor and the series of positions and position-defining commutator segments are designated in the manner described above.

| Binary Code Number | | | Position Represented by the Code Number | Highest Segment Energized | Logical Statement |
|---|---|---|---|---|---|
| C | B | A | | | |
| 0 | 0 | 0 | 1 | 0 | |
| 0 | 0 | 1 | 2 | 1 | A or B or C |
| 0 | 1 | 0 | 3 | 2 | B or C |
| 0 | 1 | 1 | 4 | 3 | C or (A and B) |
| 1 | 0 | 0 | 5 | 4 | C |
| 1 | 0 | 1 | 6 | 5 | (A and C) or (B and C) |
| 1 | 1 | 0 | 7 | 6 | (B and C) |
| 1 | 1 | 1 | 8 | 7 | (A and B and C) |

As indicated in the above table, the position-indicating conductor leading to the highest energized commutator segment for each position is connected through diode elements comprising OR gates to the binary code input or first matrix output conductors represented in the logical statement. Inasmuch as no diode is required when only one input conductor is connected to the selected position-indicating conductor, as is the case at positions 5, 7 and 8, it is apparent that the second network of a three-digit system arranged according to the invention requires only nine diode elements to perform the transformation. Furthermore, it can be demonstrated by appropriate expansion of the table that similar systems for converting code numbers having $m$ digits can be arranged with $m\cdot(2^{m-1}-1)$ diodes in the second network, thus requiring a total of only $2m\cdot(2^{m-1}-1)$ diodes for the entire system. Accordingly, a calculation of the number of diode elements required for various values of $m$ in the conventional matrices and in the reduced networks arranged according to the invention gives the following values illustrating the efficiency and economy of the network system of the invention:

| $m$ | Diodes Required | |
|---|---|---|
| | Conventional | Reduced |
| 2 | 11 | 4 |
| 3 | 48 | 18 |
| 4 | 179 | 56 |
| 5 | 650 | 150 |
| 6 | 2,393 | 372 |

Referring to the accompanying drawing, a typical embodiment of the invention arranged to translate a three-digit binary code number into a positioning signal specifying one of eight positions in accordance with the tabulation set forth above is illustrated. In order to represent each code number, three binary code input conductors 10, 11 and 12 are energizable through three terminals 13, 14 and 15 according to the values of the three code digits A, B and C, respectively, a negative signal indicating a "1" and a zero potential representing "0." Each combination of input code signals energizing two or more of these conductors is selected by a first network 16 comprised of diode elements 17 arranged as AND gates to energize one of four output conductors 18, 19, 20 and 21.

In order to operate the AND gates in the network 16, each of the input and output conductors thereto is connected through a resistor 22 to a negative line 23 maintained at a voltage approximately equal to that of an input signal representing a "1." As an example, two diode elements 17 forming an AND gate have their anodes connecting to the input conductors 10 and 11, respectively, which represent the digits A and B, and their cathodes joined to the output line 21 representing the combination "A and B" so that this line is held at a negative potential by the conductor 23 only when both the conductors 10 and 11 are negative. In a similar manner, energization of the lines 18, 19 and 20 represents negative energization of the input conductors in the combinations "A and B and C," "A and C" and "B and C," respectively.

It will be readily apparent from the above that in response to each combination code signal at least one of the conductors 18, 19, 20 and 21 is activated along with two or more of the conductors 10, 11 and 12 and, in order to obtain the advantages of the invention, all these conductors form the input to a second network 24. Within this matrix, another group of diode elements 25, arranged to operate as OR gates, links selected input conductors with a series of seven position-indicating output conductors 27–33. Each of these conductors leads to one of a series of commutator segments 35 labeled "1" through "7" in accordance with the notation outlined above. In addition, in order to provide limiting boundaries at each end of the series, another conductor 26 connects a "0" segment 35 through a resistor 22 to the negative line 23 while, at the other end of the series, a conductor 34 grounds the last segment of the series, labeled "8."

As described above, the boundary between each adjacent pair of commutator segments defines one of a series of positions, each of which is designated in the drawing by the number associated with the higher adjacent commutator segment 35, and all the segments below a selected position are energized by the binary code representing the position while all those above remain unenergized. In order to generate an error signal indicating the direction between its actual location and the selected position, a typical member 36 to be positioned includes two insulatively mounted brushes 37 and 38 arranged to contact the adjacent commutator segments at each position and is driven parallel to the series of segments by a drive unit 39 in response to the error signal. Each of the brushes 37 and 38 is connected to ground through a resistor 40 having a much higher resistance than that of the resistors 22 and two conductors 41 and 42 carry voltage signals from the brushes to the drive unit 39 according to the energization of the segments 35. A suitable drive unit 39, which may be any well-known type, is adapted, for example, to move the member 36 to the left as viewed in the drawing from one position to another as long as both conductors 41 and 42 are at ground potential and to the right when both are negative, stopping the member at the position producing a voltage difference between the conductors.

Returning to the arrangement of the OR gates in the second network 24, it will be noted from the tabulation given above that the logical statement of the code number "001" for the position designated "2" including the codes for this and all higher positions is "A or B or C." Accordingly, the position-indicating conductor 27 leading to the next lower segment 35 labeled "1" is connected by diodes 25 in the second network to the conductors 10, 11 and 12, representing the digits A, B, and C so that energization of any of these lines activates this position-indicating conductor. Similarly, the logical statement for the "3" position is "B or C" and, in order to satisfy this, the conductor 28, leading to the "2" segment, is linked through two OR gate diodes 25 to the input lines 11 and 12. Following the arrangement indicated in the tabulation, the conductor 29 is connected by an OR gate to the conductors 12 and 21 representing "C" and "A and B," respectively. Inasmuch as only the "C" input conductor 12 energizes the output conductor 30 in accordance with the tabulation no diode element is necessary at this junction. In the same way, the output conductors 32 and 33 are directly connected to the input conductors 20 and 18, respectively, the conductor 31 being energized through diodes from either of the lines 19 and 20 representing "A and B" and "B and C," respectively. Thus, it will be observed that, for each position represented by a combination code, the network system of the invention utilizes the energization of the binary code input conductors and the first network output conductors representing subcombinations of the combination code to activate the position-indicating conductors in one direction therefrom.

In operation, the conductors 10, 11 and 12 are each energized according to the condition of the corresponding digits A, B, and C of the code number. Whenever one of the binary input conductors 10, 11 and 12 is held at ground potential indicating "0," each of the AND gate diodes 17 having its anode connected to this conductor draws current through the resistor 22 through which its cathode is joined to the negative conductor 23, raising the corresponding first network output conductor to ground potential. However, if all the binary input conductors connected by diodes to any output conductor are at a negative potential representing a "1," none of the diodes will conduct and the negative line 23 maintains the corresponding first network output conductor at a negative potential. In this manner, each of the output conductors 18, 19, 20 and 21 is energized by a selected combination signal actuating selected binary code input conductors.

In the second network 24, each of the diodes 25 which are arranged as OR gates can conduct whenever the input line joined to its cathode becomes negative, thus inducing a negative potential at the position-indicating output conductor linked to its anode. Therefore, a circuit through either of the brushes 37 and 38 and the associated resistor 40 drives each output conductor to a negative potential when the member 36 is at an adjacent position if any of the input lines to which it is connected by diodes 25 is negative, the voltage drop through the resistors 22 being a small fraction of that through the resistors 40.

An examination of the typical circuit illustrated in the drawing will demonstrate that the specified arrangement of the diodes in the networks satisfies the requirements of the system, energizing all the segments 35 lower than the selected position and none above that position. As an example, assume that the position "3," represented by the code number "010," is selected by energizing the conductor 11 negatively and holding the lines 10 and 12 at ground potential. In this case, none of the AND gates are activated since only one binary input conductor is negative and only the conductors 27 and 28 are activated through the diodes 25 linking them to the conductor 11. Thus, commutator segments "0," "1" and "2" are energized negatively while the rest remain at ground potential.

If the position "6" is selected, the conductors 10 and 12 have negative signals according to the code number "101." In this case, the first network output line 19 becomes negatively energized because neither of the diodes 17 connecting it to these lines can conduct. Accordingly, the segment designated "5" is activated by the diode 25 in the second network linking the conductors 19 and 31. Inasmuch as the "C" conductor 12 has a negative signal, the segments designated "1," "2" and "3," which are joined thereto through diodes 25 and the segment "4" which is directly connected thereto, are also held at a negative potential, thus utilizing a component of the combination signal to energize segments in one direction from a selected position. In a similar manner any other position in the series is selected by energizing the conductors 10, 11 and 12 according to the corresponding binary code number, the energization of each of these conductors and combinations thereof included in the binary number controlling the activation of commutator segments below the designated position.

Although the invention has been described herein with reference to a specific embodiment, many modifications and variations thereof will readily occur to those skilled in the art. Accordingly, the invention is not intended to be restricted in scope except as defined by the following claims.

I claim:

1. A system for converting a binary code number into a positioning signal comprising a plurality of monopolar binary code input conductors, each representing one digit of the binary code, first network means connected to the binary code input conductors and having a plurality of output conductors and including AND gate means responsive to energization of more than one binary code conductor to energize a selected output conductor representing the combination of code conductors energized, and second network means connected to the binary code input conductors and the first network means output conductors and including a plurality of position-indicating output conductors arranged in sequential order and OR gate means energizing a selected position-indicating output conductor in response to each combination signal and all the position-indicating conductors in the sequence in one direction therefrom in response to energization of conductors representing components of the combination signal.

2. A system for converting a binary code number into a positioning signal comprising a plurality of monopolar binary code input conductors, each representing one digit of the binary code, first network means connected to the binary code input conductors and having a plurality of output conductors and including AND gate means responsive to energization of more than one binary code conductor to energize a selected output conductor representing the combination of code conductors energized, and second network means connected to the binary code input conductors and the first network means output conductors and including a plurality of position-indicating output conductors arranged in sequential order and OR gate means energizing a selected position-indicating output conductor in response to each combination signal and other position-indicating conductors in one direction therefrom in response to energization of at least one of the binary code conductors.

3. A system for converting a binary code number into a positioning signal comprising a plurality of monopolar binary code input conductors, each representing one digit of the binary code, first network means having a plurality of output conductors and including AND gate means responsive to energization of more than one binary code conductor to energize a selected output conductor representing the combination of code conductors energized, and second network means including a plurality of position-indicating output conductors arranged in sequential order and OR gate means energizing a selected position-indicating output conductor in response to a signal representing energization of three or more binary code conductors and other position-indicating conductors in one direction therefrom in response to energization of the first network output conductors representing subcombinations of the energized binary code conductors and in response to energization of the binary code conductors.

4. A system for converting a binary code number into a positioning signal comprising a plurality of monopolar binary code input conductors, each representing one digit of the binary code, first network means having a plurality of output conductors and including AND gate means responsive to energization of more than one binary code conductor to energize a selected output conductor representing the combination of code conductors energized, and second network means including a plurality of position-indicating output conductors arranged in sequential order and OR gate means energizing a selected position-indicating output conductor in response to a signal representing energization of three or more binary code conductors and energizing a sequence of adjacent position-indicating conductors in one direction therefrom in response to energization of the first network output conductors representing subcombinations of the energized binary code conductors and energizing the remaining position-indicating conductors in the same direction in the sequence in response to energization of a binary code conductor.

5. A system for converting a binary code number into a positioning signal indicating a selected position in a sequence of positions by electrically energizing all of a sequence of position-indicating conductors in one direction from the position and none in the other direction comprising a plurality of binary code input conductors each corresponding to one of the digits of the binary code number and each arranged to be energized to represent one condition of the corresponding binary digit and de-energized to represent the other condition, first network means responsive to the binary code input conductors including a plurality of output conductors each connected through AND gate means to two or more selected input conductors to be energized in response to simultaneous energization thereof, and second network means responsive to the binary code input conductors and the first network output conductors including OR gate means energizing selected position-indicating conductors, the OR gate means including diode means connecting the first position-indicating conductor in the sequence to all the binary code input conductors, the second position-indicating conductor to all except one of the binary code input conductors, and the third position-indicating conductor to all except one of the second position-indicating conductors and to the first network output conductor representing the combination of the two binary code conductors not connected to the third position-indicating conductor.

6. A system according to claim 5 wherein the fourth position-indicating conductor is connected to the same binary code input conductors as the third position-indicating conductor.

7. A system according to claim 5 wherein the last position-indicating conductor of the sequence is directly connected to the first network output conductor representing simultaneous energization of all the binary code input conductors.

8. A system for converting a three-digit binary code number into a positioning signal indicating a selected position in a sequence of eight positions by electrically energizing all of a sequence of position-indicating conductors in one direction from the position and none in the other direction comprising three binary code input conductors each representing one of the digits and arranged to be energized according to the condition of the corresponding digit, a first network having four output conductors each representing a combination of two or more binary code conductors and linked thereto through an AND gate, a second network having as input conductors all of the binary code and first matrix output conductors and including a plurality of OR gates arranged to energize the first position-indicating conductor from any of the binary code conductors, the second position-indicating conductor from the second and third binary code conductors, the third position-indicating conductor from the third binary code conductors and from the first network output conductor representing the combination of the first two binary code conductors, and the fifth position-indicating conductor from the first network output conductors representing the combinations of the first and third and second and third binary code conductors, the remaining position-indicating conductors each being connected directly to a corresponding second network input conductor.

References Cited in the file of this patent

UNITED STATES PATENTS

| | | |
|---|---|---|
| 2,570,716 | Rochester | Oct. 9, 1951 |
| 2,798,667 | Spielberg | July 9, 1957 |
| 2,808,986 | Stone | Oct. 8, 1957 |
| 2,886,241 | Spaulding | May 12, 1959 |

OTHER REFERENCES

Proceedings of the IRE, February 1949, pp. 139–147, "Rectifier Networks for Multiposition Switching" (Brown et al.).

UNITED STATES PATENT OFFICE
CERTIFICATE OF CORRECTION

Patent No. 3,060,420 October 23, 1962

Robert M. Brink

It is hereby certified that error appears in the above numbered patent requiring correction and that the said Letters Patent should read as corrected below.

Column 8, line 13, for "matrix" read -- network --.

Signed and sealed this 26th day of March 1963.

(SEAL)
Attest:

ESTON G. JOHNSON
Attesting Officer

DAVID L. LADD
Commissioner of Patents